United States Patent
Yeo (10) Patent No.: US 9,082,027 B2
(45) Date of Patent: Jul. 14, 2015

(54) NEAR FIELD COMMUNICATION TAG READER, MOBILE TERMINAL FOR INTERWORKING WITH THE READER, AND OPERATING METHOD THEREOF

(71) Applicant: LSIS CO., LTD., Anyang-si, Gyeonggi-do (KR)

(72) Inventor: Seon Mi Yeo, Seongnam-si (KR)

(73) Assignee: LSIS Co., Ltd., Anyang-Si, Gyeonggi-Do (KR)

(*) Notice: Subject to any disclaimer, the term of this patent is extended or adjusted under 35 U.S.C. 154(b) by 10 days.

(21) Appl. No.: 14/023,262

(22) Filed: Sep. 10, 2013

(65) Prior Publication Data

US 2014/0085090 A1 Mar. 27, 2014

(30) Foreign Application Priority Data

Sep. 21, 2012 (KR) .................. 10-2012-0105039

(51) Int. Cl.
*G08B 13/14* (2006.01)
*G06K 7/10* (2006.01)
*G06K 17/00* (2006.01)
*G06Q 10/08* (2012.01)

(52) U.S. Cl.
CPC ........ *G06K 7/10386* (2013.01); *G06K 17/0029* (2013.01); *G06Q 10/087* (2013.01)

(58) Field of Classification Search
CPC .......... G06K 17/0029; G06K 7/10386; G06K 7/0008; G06K 7/10366; G06K 2007/10524; G06Q 10/087; G06Q 10/0833; B07C 5/38
USPC ............ 340/572.1–572.9, 10.1; 235/380, 385
See application file for complete search history.

(56) References Cited

U.S. PATENT DOCUMENTS

| | | | | |
|---|---|---|---|---|
| 6,232,870 | B1* | 5/2001 | Garber et al. ................ | 340/10.1 |
| 8,704,642 | B2* | 4/2014 | Chen ........................... | 340/10.6 |
| 2001/0008390 | A1* | 7/2001 | Berquist et al. ............ | 340/10.31 |
| 2007/0273525 | A1* | 11/2007 | Garber et al. .............. | 340/572.1 |
| 2008/0266092 | A1* | 10/2008 | Campero et al. ........... | 340/572.1 |

FOREIGN PATENT DOCUMENTS

| | | |
|---|---|---|
| KR | 10-0608252 | 8/2006 |
| KR | 10-2009-0001999 | 1/2009 |

OTHER PUBLICATIONS

Korean Intellectual Property Office Application Serial No. 10-2012-0105039, Office Action dated Nov. 12, 2013, 5 pages.

* cited by examiner

*Primary Examiner* — Anh V La
(74) *Attorney, Agent, or Firm* — Lee, Hong, Degerman, Kang & Waimey (57) ABSTRACT

A mobile terminal acquires an item group identifier and an item identifier from a near field communication tag reader which recognizes an item group identification tag and an item identification tag. The mobile terminal acquires item group information related to an item group corresponding to the item group identifier, and extracts information related to an arrangement location of an item corresponding to the item identifier from the item group information. The mobile terminal checks whether or not the item has been correctly arranged based on the arrangement location and an identified location of the item corresponding to the item identifier, so as to display information indicating that the item has been incorrectly arranged.

11 Claims, 12 Drawing Sheets

| ALLOWABLE MISARRANGEMENT RANGE: 00 VOLUMES RFID OUTPUT | START/STOP |
|---|---|

CORRECT ARRANGEMENT LIST

| REGISTRATION NO | CALL NO. | NAME OF BOOK |
|---|---|---|
| 10101072026 | 895.1346 L973ski | WARS OF THE CARNATION |
| 10101072027 | 895.1346 L973ski c.2 | WARS OF THE CARNATION |
| | | |
| | | |
| | | |

CHECKED LIST

| MESSAGE | REGISTRATION NO. | CALL NO. | NAME OF BOOK |
|---|---|---|---|
| MISARRANGED | 10101072026 | 895.1346 L973ski | WARS OF THE CARNATION |
| UNREGISTERED | 10101072027 | 895.1346 L973ski c.2 | WARS OF THE CARNATION |
| UNIDENTIFIED | | | |

FIG. 12

NEAR FIELD COMMUNICATION TAG READER, MOBILE TERMINAL FOR INTERWORKING WITH THE READER, AND OPERATING METHOD THEREOF

CROSS-REFERENCE TO RELATED APPLICATION

Pursuant to 35 U.S.C. §119(a), this application claims the benefit of earlier filing date and right of priority to Korean Application No. 10-2012-0105039, filed on Sep. 21, 2012, the contents of which is incorporated by reference herein in its entirety.

BACKGROUND OF THE DISCLOSURE

1. Field of the Disclosure

This specification relates to a reader with a near field communication module, a mobile terminal for interworking with the reader, and an operating method thereof, and particularly, to a mobile terminal for providing item management based on tag information, and an operating method thereof.

2. Background of the Disclosure

In the related art, a terminal for item management includes a display, a main operating unit such as a central processing unit (CPU), a communication module for communication with a server, and a radio frequency identification (RFID) reader.

Such type of terminal has disadvantages in general purpose use due to having developed for industrial use, and inconvenient use due to a heavy weight.

To reduce the weight for user convenience, a size of the display has been reduced. This, however, has caused a limit in view of providing UIs for item management.

SUMMARY OF THE DISCLOSURE

Therefore, an aspect of the detailed description is to provide a terminal capable of providing a convenient item management function through a wider display as well as increasing general purpose use, and an operating method thereof.

To achieve these and other advantages and in accordance with the purpose of this specification, as embodied and broadly described herein, there is provided an operation method for a mobile terminal including acquiring an item group identifier from a near field communication tag reader by recognizing an item group identification tag and an item identification tag, acquiring item group information related to an item group corresponding to the item group identifier, acquiring an item identifier from the near field communication tag reader, extracting information related to an arrangement location of an item corresponding to the item identifier from the item group information, checking whether or not the item has been correctly arranged based on the arrangement location and an identified location of the item corresponding to the item identifier, and displaying information indicating that the item has been incorrectly arranged.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of a mobile terminal according to the exemplary embodiments, with reference to the accompanying drawings. A suffix "module" or "unit" used for constituent elements disclosed in the following description is merely intended for easy description of the specification, and the suffix itself does not give any special meaning or function.

Hereinafter, description will be given of a network topology in accordance with an exemplary embodiment with reference to FIG. 1.

Figure 1:
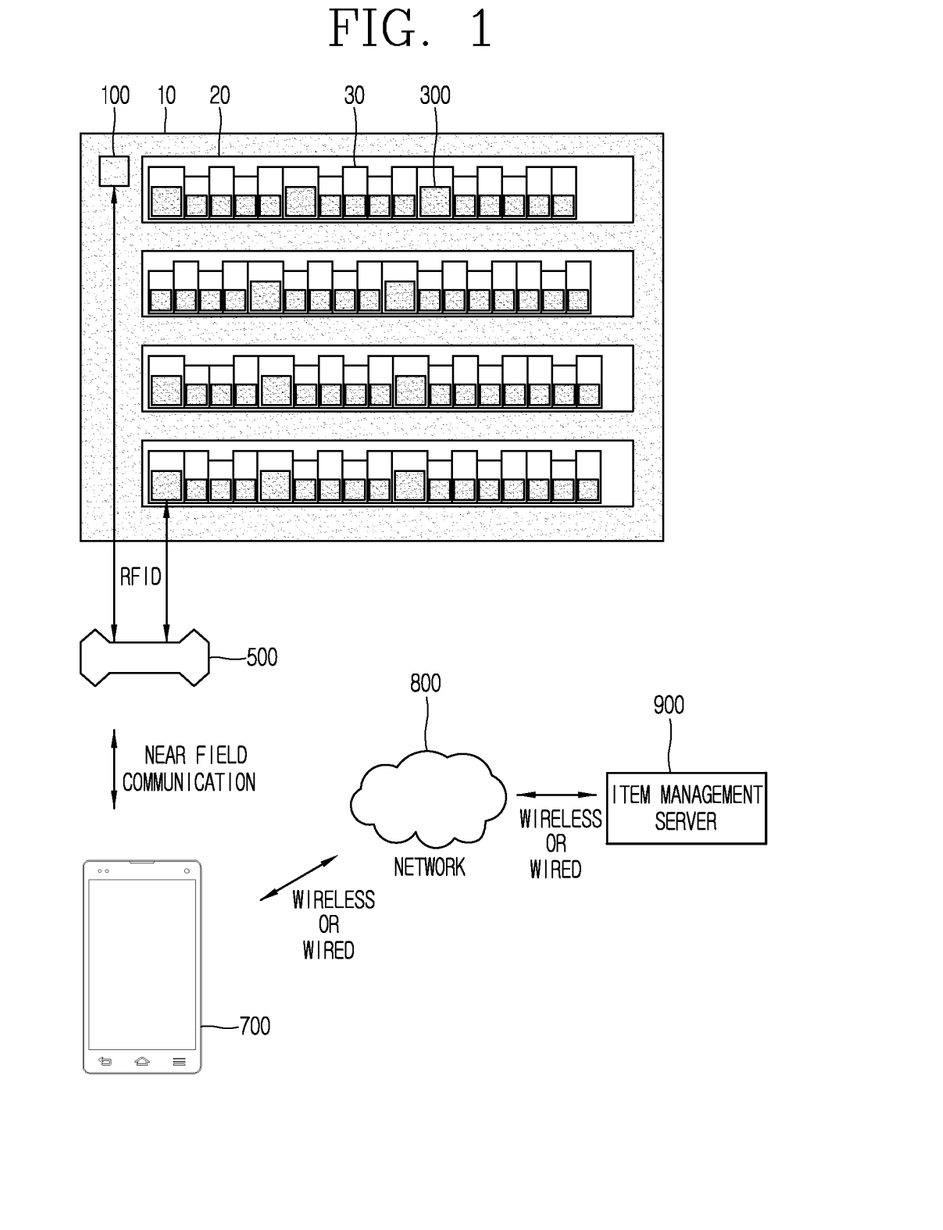
FIG. 1 is a view illustrating a network topology in accordance with an exemplary embodiment.

FIG. 1 illustrates a network topology in accordance with an exemplary embodiment of the present disclosure.

As illustrated in FIG. 1, a network topology in accordance with an exemplary embodiment may include an item group identification tag 100, an item identification tag 300, a near field communication tag reader 500, a mobile terminal 700, a network 800, and an item management server 900.

The item group identification tag 100, which is attached onto an item arrangement space 10, may be a tag for identifying an item group, for example, a radio frequency identification (RFID) tag. A plurality of items may belong to an item group. The item arrangement space 10 may be divided into a plurality of item arrangement sub spaces 20. A tag reader such as the near field communication tag reader 500 may read information within the item group identification tag 100. Here, the tag reader may receive an item group identifier from the item group identification tag 100. The item group identification tag 100 may be an active RFID tag or a passive RFID tag. When the item group identification tag 100 is the passive RFID tag, the tag reader may radiate RF power, and the item group identification tag 100 may transmit an item group identifier using the radiated RF power. Here, the item group identifier may correspond to an RFID code.

The item identification tag 300, which is attached onto an item 30, may be a tag for identifying an item, for example, an RFID tag. Examples of the item may include books, various tools, furniture, goods and the like. When the item is a book, the item group may be a bookcase or a bookshelf. The tag reader such as the near field communication tag reader 500 may read information within the item identification tag 300. Here, the tag reader may receive an item identifier from the item identification tag 300. The item identification tag 300 may be an active RFID tag and a passive RFID tag. When the item identification tag 300 is the passive RFID tag, the tag reader may radiate RF power and the item identification tag 300 may transmit the item identifier using the radiated RF power. Here, the item identifier may correspond to an RFID code.

The near field communication tag reader 500 may receive the item group identifier from the item group identification tag 100, and receive the item identifier from the item identification tag 300. The near field communication tag reader 500 may transmit the received identifiers to the mobile terminal 700 using near field communication without classifying the identifiers into the item group identifier and the item identifier.

The mobile terminal 700 may receive the item group identifier and the item identifier from the near field communication tag reader 500. Accordingly, the mobile terminal 700 may request for information corresponding to the received identifiers from the item management server 900, or execute operations based on the received identifiers.

The item management server 900 may provide information requested by the mobile terminal 700.

Hereinafter, description will be given of a structure of devices in accordance with the exemplary embodiment, with reference to FIGS. 2 to 4.

Figure 2:
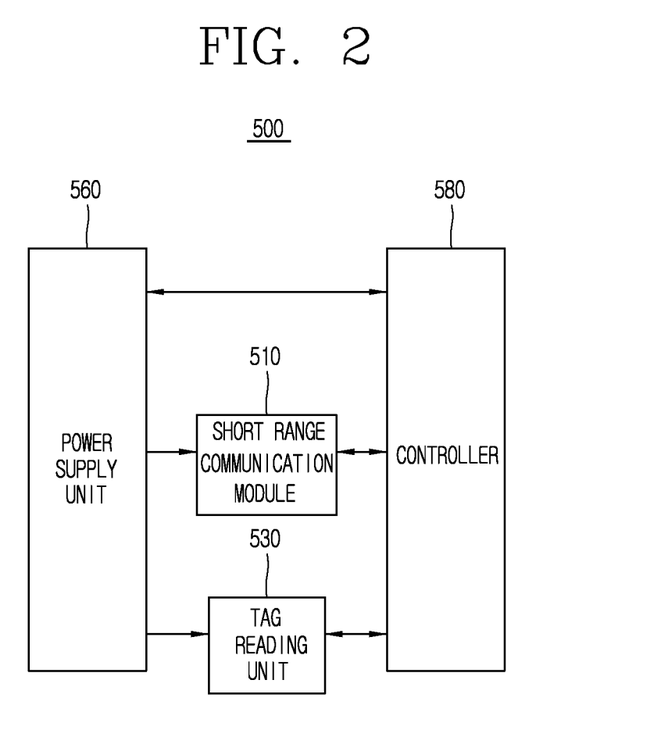
FIG. 2 is a block diagram of a near field communication tag reader in accordance with the exemplary embodiment.

FIG. 2 is a block diagram of the near field communication tag reader in accordance with the exemplary embodiment.

As illustrated in FIG. 2, the near field communication tag reader 500 according to the exemplary embodiment may include a near field communication module 510, a tag reading unit 530, a power supply unit 560, and a controller 580.

The near field communication module 510 may execute communication with a near field communication module of the mobile terminal 700 within a short range through direct communication without participation of a base station such as an access point. The near field communication module 510 may be a Bluetooth module.

The tag reading unit 530 may recognize the item group identification tag 100 and the item identification tag 300, and read information within the item group identification tag 100 and the item identification tag 300. When the item identification tag 300 is a passive RFID tag, the tag reading unit 530 may radiate RF power and receive a transmitted item identifier using the radiated RF power.

The power supply unit 560 may supply power to the near field communication module 510, the tag reading unit 530, and the controller 580. The power supply unit 560 may include a battery and a DC-DC converter.

The controller 580 may generally control the near field communication tag reader 500. Specifically, the controller 580 may control the near field communication module 510, the tag reading unit 530 and the power supply unit 560.

Hereinafter, description will be given of operations of components of the near field communication tag reader 500 according to the exemplary embodiment.

Figure 3:
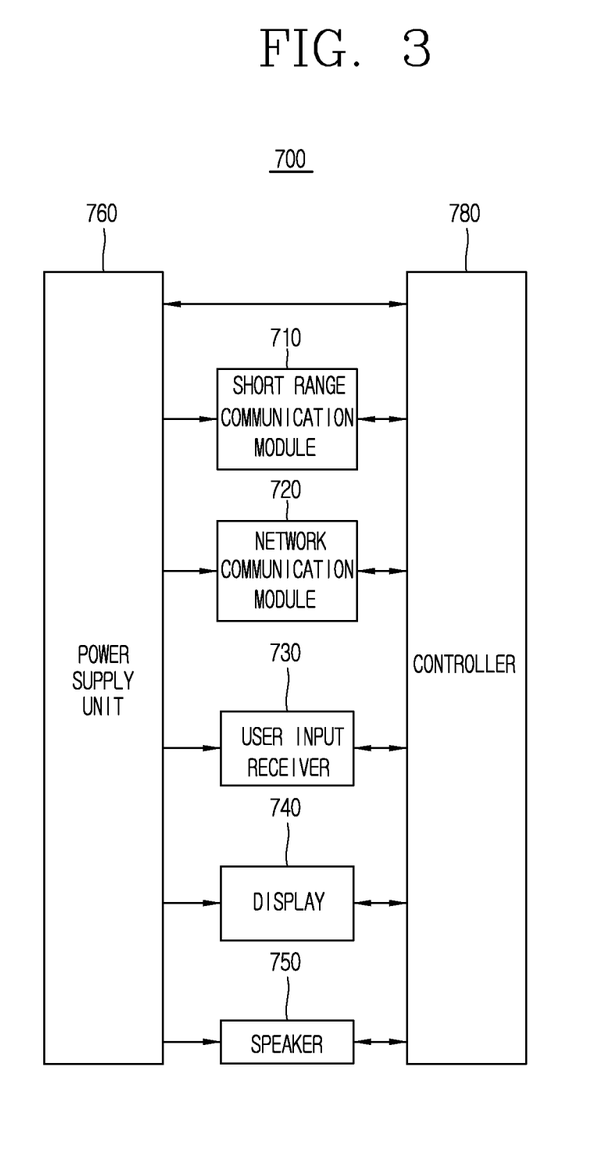
FIG. 3 is a block diagram of a mobile terminal in accordance with the exemplary embodiment.

FIG. 3 is a block diagram of a mobile terminal in accordance with the exemplary embodiment.

As illustrated in FIG. 3, the mobile terminal 700 according to the exemplary embodiment may include a near field communication module 710, a network communication module 720, a user input receiver 730, a display 740, a speaker 750, a power supply unit 760, and a controller 780.

The mobile terminal 700 may be a smart device, such as a smart phone, a smart pad, and the like.

The near field communication module 710 may execute communication with the near field communication module of the near field communication tag reader 500 within a short range through direct communication without participation of a base station such as an access point. The near field communication module 710 may be a Bluetooth module.

The network communication module 720 may communicate with the item management server 900 connected to the network 800. The network communication module 720 may wirelessly communicate with a base station accessed to the network 800, and communicate with a middleware accessed to the network 800. The middleware may communicate with the item management server 900.

The user input receiver 730 may receive user inputs through a motion sensor, a touchpad, physical buttons, virtual buttons output on the display 740 and the like. The user input may be a motion gesture of the mobile terminal 700, a pattern drawn on the touchpad, pressing of a button and the like.

The display 740 may output a screen generated by the controller 780. The display 740 may be one of a liquid crystal display (LCD), a thin film transistor-liquid crystal display (TFT LCD), an organic light emitting diode (OLED), a flexible display, a three-dimensional (3D) display and the like.

The speaker 750 may output sound generated by the controller 780.

The power supply unit 760 may supply power to the near field communication module 710, the network communication module 720, the user input receiver 730, the display 740, the speaker 750, and the controller 780. The power supply unit 760 may include a battery and a DC-DC converter.

The controller 780 may generally control the mobile terminal 700. The controller 780 may control the near field communication module 710, the network communication module 720, the user input receiver 730, the display 740, the speaker 750, and the power supply unit 760.

Hereinafter, description will be given of operations of the components of the mobile terminal 700 according to the exemplary embodiment.

Figure 4:
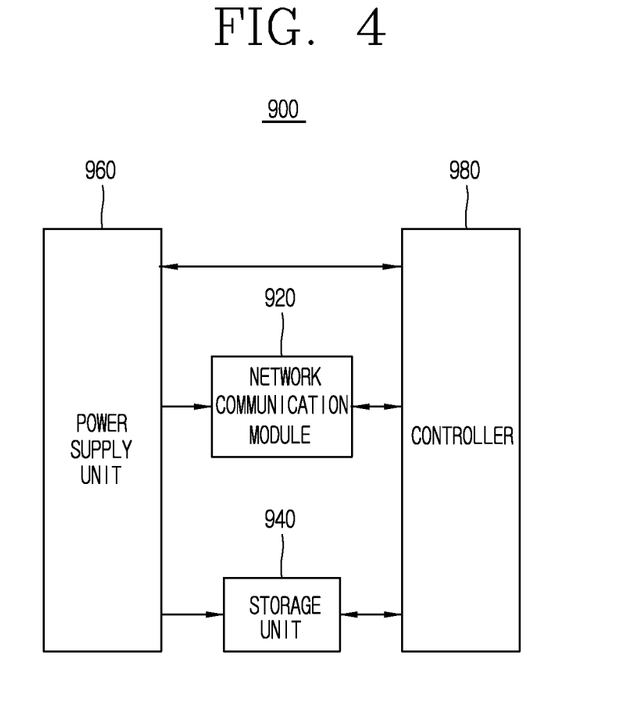
FIG. 4 is a block diagram of an item management server in accordance with the exemplary embodiment.

FIG. 4 is a block diagram of an item management server in accordance with the exemplary embodiment.

As illustrated in FIG. 4, the item management server 900 may include a network communication module 920, a storage unit 940, a power supply unit 960, and a controller 980.

The network communication module 920 may communicate with the mobile terminal 700 accessed to the network 800.

The storage unit 940 may store a plurality of item group information corresponding to a plurality of item groups, respectively. Each item group information may include a plurality of item information corresponding to a plurality of items belonging to the corresponding item group.

The power supply unit 960 may supply power to the network communication module 920, the storage unit 960, and the controller 980. The power supply unit 960 may include a battery and a DC-DC converter.

The controller 980 may generally control the item management server 900. Especially, the controller 980 may control the network communication module 920, the storage unit 940, and the power supply unit 960.

Operations of the components of the item management server 900 will be explained later.

Hereinafter, description will be given of operations of the devices according to the exemplary embodiment with reference to FIGS. 5 and 6.

Figure 5:
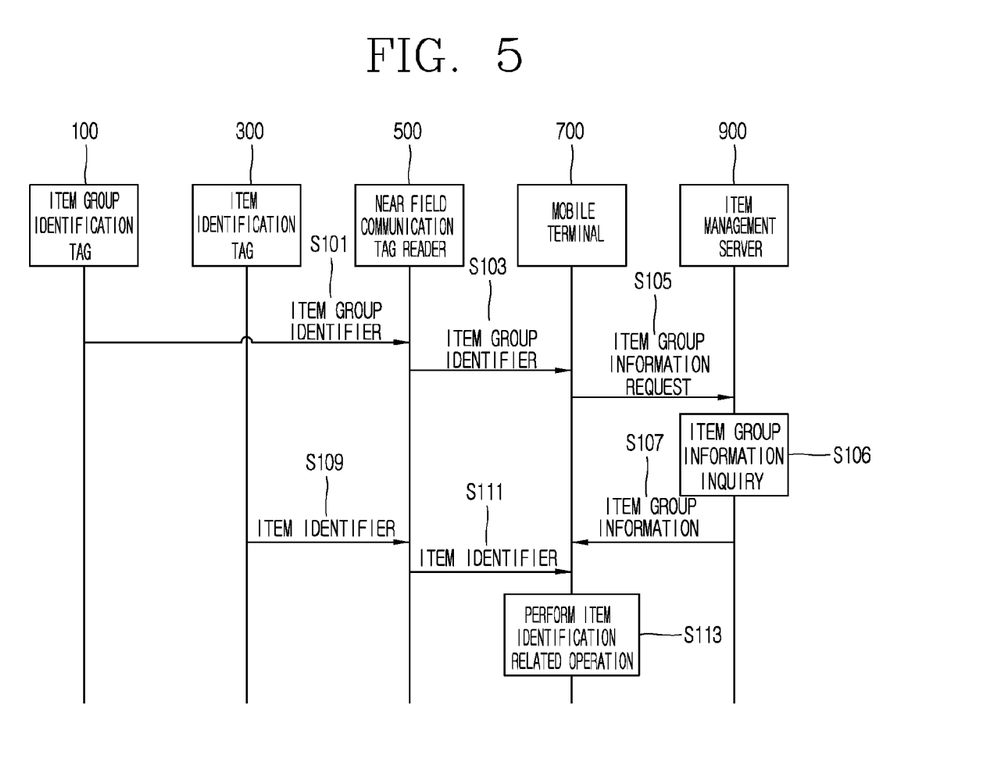
FIG. 5 is a ladder diagram illustrating operations of devices in accordance with the exemplary embodiment.

FIG. 5 is a ladder diagram illustrating operations of the devices in accordance with the exemplary embodiment.

First, the controller 580 of the near field communication tag reader 500 may receive an item group identifier from the item group identification tag 100 through the tag reading unit 530 (S101).

The controller 580 of the near field communication tag reader 500 may transmit the received item group identifier to the mobile terminal 700 through the near field communication module 510 (S103). The controller 780 of the mobile terminal 700 may receive the item group identifier through the near field communication module 710.

The controller 780 of the mobile terminal 700 may transmit an item group information request message to the item management server 900 through the network communication module 720, to request for information relating to an item group corresponding to the item group identifier (S105).

Upon reception of the item group information request message, the controller 980 of the item management server 900 may inquire the item group information corresponding to the item group identifier within the item group information request message from the storage unit 940 (S106). Here, the item group information may include item information relating to each of a plurality of items included in the item group corresponding to the item group identifier. The item information may include at least one of an item identifier, an item management number, item shape information, item arrangement location information and an item name. The item shape information may include information related to a shape of the item and information related to a size of the item. The item identifier or the management number may be used as the item arrangement location information.

When an item is a book, the item management number may indicate a call number used in a library. Since the book has a feature of a rectangular hexagon, the information related to the shape of the item may merely include the size of the book without the information related to the shape of the item. The information related to the size of the item may include information related to a height of the book and information related to a thickness of the book. The information related to the thickness of the book may be represented in a length unit, or with the number of pages. The item arrangement location information may be a call number of a book. The item name may indicate a name of a book. The item information may include information related to a publisher of a book, and information related to an author of the book.

The controller 980 of the item management server 900 may transmit the inquired item group information to the mobile terminal 700 through the network communication module 920 (S107).

Meanwhile, instead of the steps S105 to S107, the mobile terminal 700 may includes its own database (memory). That is, the mobile terminal 700 may acquire information related to the item group corresponding to the item group information by inquiring its own memory. This may allow a user to fast acquire information and be provided with a fast use of UI.

The controller 580 of the near field communication tag reader 500 may receive the item identifier from the item identification tag 300 through the tag reading unit 530 (S109).

The controller 580 of the near field communication tag reader 500 may transmit the received item identifier to the mobile terminal 700 through the near field communication module 510. Then, the controller 780 of the mobile terminal 700 may receive the item identifier through the near field communication module 710.

The controller 780 of the mobile terminal 700 may execute an operation associated with the item identification based on the received item identifier (S113).

Figure 6:
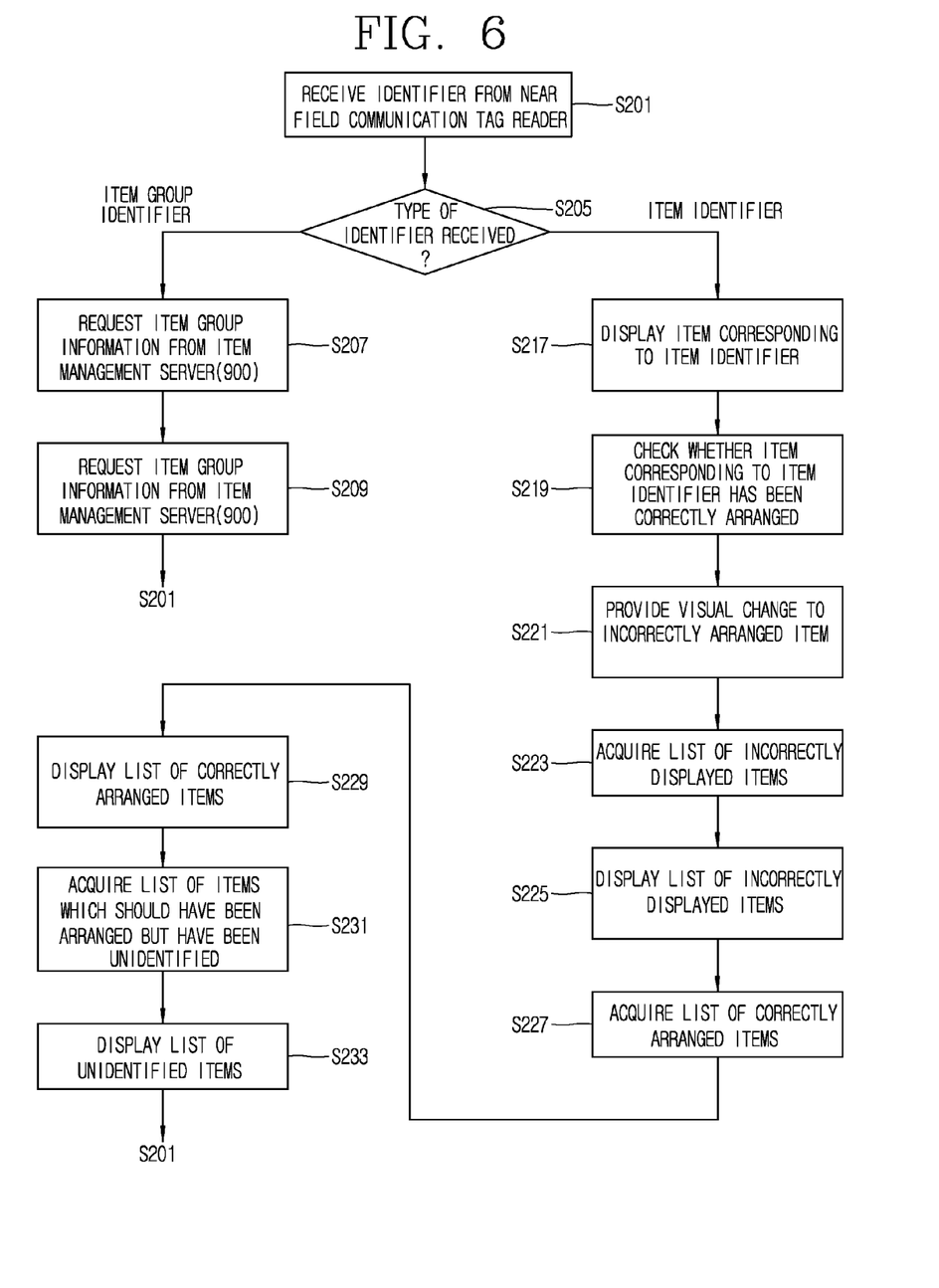
FIG. 6 is a flowchart illustrating operations of the mobile terminal in accordance with the exemplary embodiment.

FIG. 6 is a flowchart illustrating operations of the mobile terminal in accordance with the exemplary embodiment.

First, the controller 780 of the mobile terminal 700 may receive an identifier from the near field communication tag reader 500 through the near field communication module 710 (S201).

The controller 780 of the mobile terminal 700 may check a type of the received identifier (S205). Here, the controller 780 of the mobile terminal 700 may recognize whether the received identifier corresponds to an item group identifier or an item identifier. As aforementioned, the near field communication tag reader 500 may transmit the received identifier to the mobile terminal 700 using near field communication without identification (recognition) of the item group identifier or the item identifier. However, the operation of the mobile terminal 700 may change according to whether the mobile terminal 700 has received the item group identifier or the item identifier. The mobile terminal 700 may request for the check of the type of identifier from the item management server 900. However, in this case, traffic may be generated irrespective of the type of identifier. Hence, the controller 780 of the mobile terminal 700 may check the type of the received identifier without the participation of the item management server 900, thereby minimizing the traffic. Here, the identifier may have a structure of distinguishing the item group identifier and the item identifier from each other. For example, a character or a number for distinguishing the type of identifier may be arranged on a predetermined position of the identifier.

When the received identifier corresponds to the item group identifier, the controller 780 may transmit an item group information request message to the item management server 900 through the network communication module 720, to request for information related to an item group from the item management server 900 (S207). The controller 780 may wirelessly transmit the item group information request message to the item management server 900 through the network communication module 720. Here, the item group information request message may include the received item group identifier and an identifier of the mobile terminal 700. The controller 980 of the item management server 900 may receive the item group information request message from the mobile terminal 700 through the network communication module 920.

The controller 780 of the mobile terminal 700 may wirelessly receive the item group information from the item management server 900 through the network communication module 720 (S209).

When the received identifier corresponds to the item identifier, the controller 780 may output an item corresponding to the item identifier on the display 740 according to an item identification sequence (S217). For example, the controller 780 may display an item corresponding to a first-identified (first-recognized) item identifier on the most left side of the item arrangement sub space 20, and display an item corresponding to a second-recognized item identifier on the very right side of the first-identified item. Here, the controller 780 may output the item corresponding to the item identifier on the display 740 further based on item information corresponding to the item identifier. For example, based on shape information related to an item corresponding to an item identifier, the controller 780 may display the item corresponding to the item identifier on the display 740 into the shape corresponding to the shape information on the display 740. When item size information corresponding to the item identifier is not present, the controller 780 may output the item corresponding to the item identifier into a default shape on the display 740. The default shape may be rectangular. Also, based on a name of an item within item information corresponding to an item identifier, the controller 780 may output the corresponding item with the name on the display 740.

Afterwards, the controller 780 may compare the arrangement location information related to the item corresponding to the item identifier with the identification sequence of the item, to check whether or not the item corresponding to the item identifier has been correctly arranged (S219). When a difference between the arrangement location of the item corresponding to the item identifier and an identified location of the item does not exceed a threshold value, the controller 780 may determine that the corresponding item has correctly been arranged. When the difference exceeds the threshold value, the controller 780 may determine that the corresponding item has incorrectly been arranged. For example, if it is assumed that a threshold value is 4, and the item should be a $10^{th}$ item according to the arrangement location information related to the item corresponding to an item identifier but the controller 780 has identified the corresponding item as a $15^{th}$ item in the item arrangement sub space 20, the difference between the arrangement location of the item and the identified location of the item exceeds the threshold value. Therefore, the controller 780 may determine that the item corresponding to the item identifier has been incorrectly arranged.

When the item corresponding to the item identifier has been incorrectly arranged, the controller 780 may notify it to the user by providing a visual effect onto the incorrectly arranged item (S221). For example, the controller 780 may change a color of the incorrectly arranged item to be different from colors of correctly arranged items. Also, the controller 780 may provide a flickering effect to the incorrectly arranged item.

The controller 780 may acquire a list of incorrectly arranged items through the step S219 (S223), and output the list of the incorrectly arranged items on the display 740 (S225).

The controller 780 may acquire a list of correctly arranged items through the step S219 (S227), and output the list of correctly arranged items on the display 740 (S229).

The controller 780 may acquire a list of items, which have been arranged but have been unidentified through the step S219 (S231), and output the list of unidentified items on the display 740 (S233).

Meanwhile, the controller 780 may check a presence of an item within an identified item group, instead of checking the correctly arranged state, and display the checked information. This may allow for inventory management, and inspection of book stock, and the like.

Hereinafter, description will be given of graphic user interfaces (GUIs) provided by the mobile terminal 700 in accordance with the exemplary embodiment, with reference to FIGS. 7 to 12.

FIGS. 7 to 12 are views illustrating graphic user interfaces (GUIs) provided by the mobile terminal.

Figure 7:
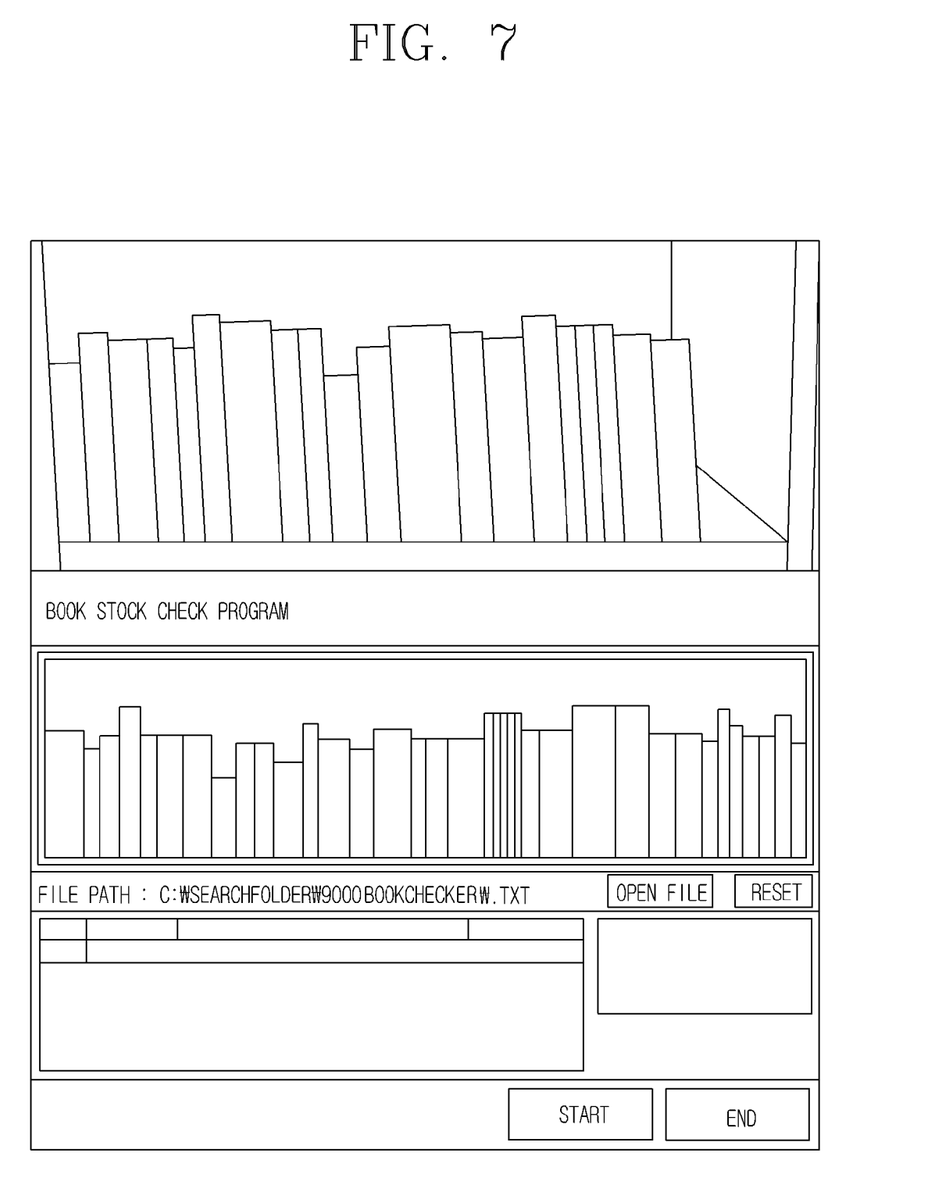
FIGS. 7 to 12 are views illustrating graphic user interfaces (GUIs) provided by the mobile terminal.

As illustrated in FIG. 7, the controller 780 may output an item corresponding to an item identifier into a shape corresponding to shape information on the display 740, based on the shape information related to the item corresponding to the item identifier. This may allow the item to be displayed similar to an actual state.

Figure 8:
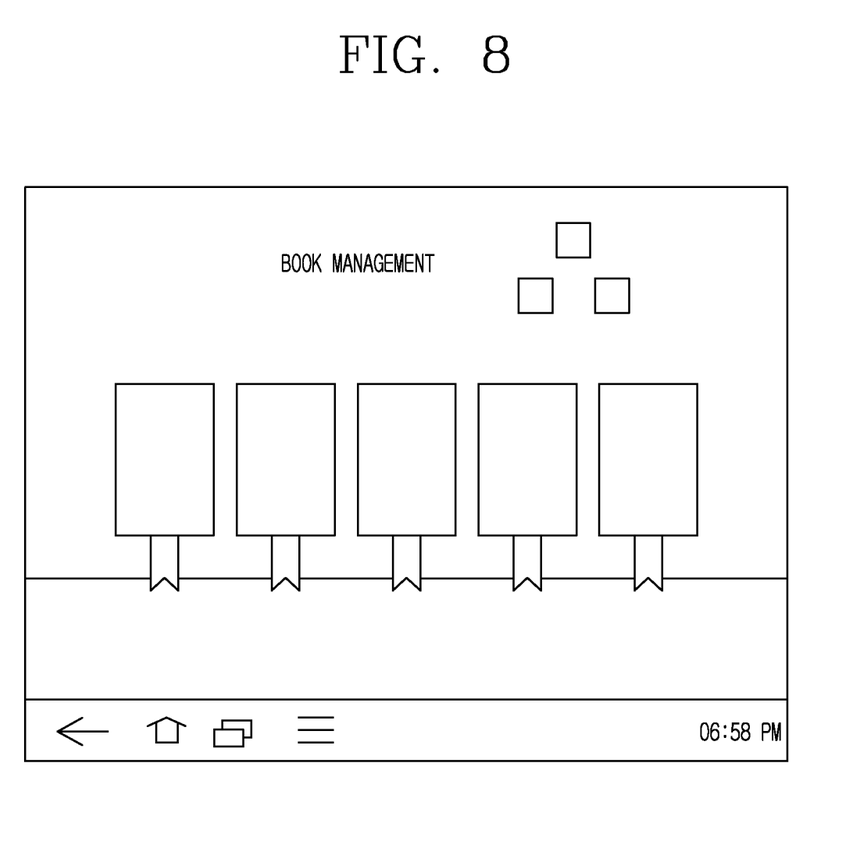

As illustrated in FIG. 8, the controller 780 may display an initial screen.

Figure 9:
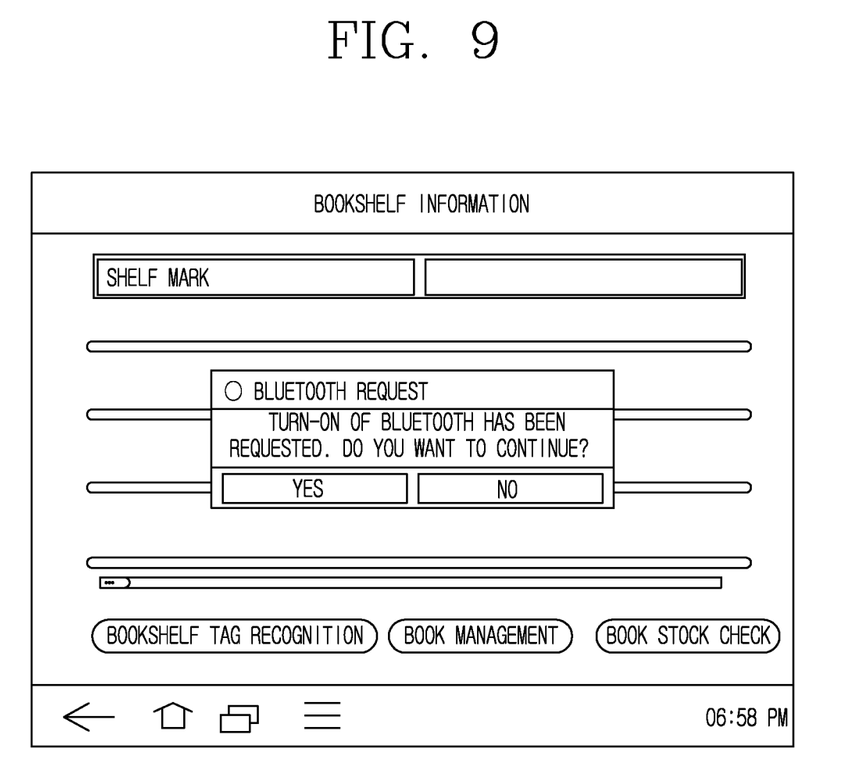

As illustrated in FIG. 9, the controller 780 may display a GUI for asking a user whether or not to turn on the near field communication module 710. Upon reception of a user command instructing the turn-on of the near field communication module 710, the controller 780 may turn on the near field communication module 710.

Figure 10:
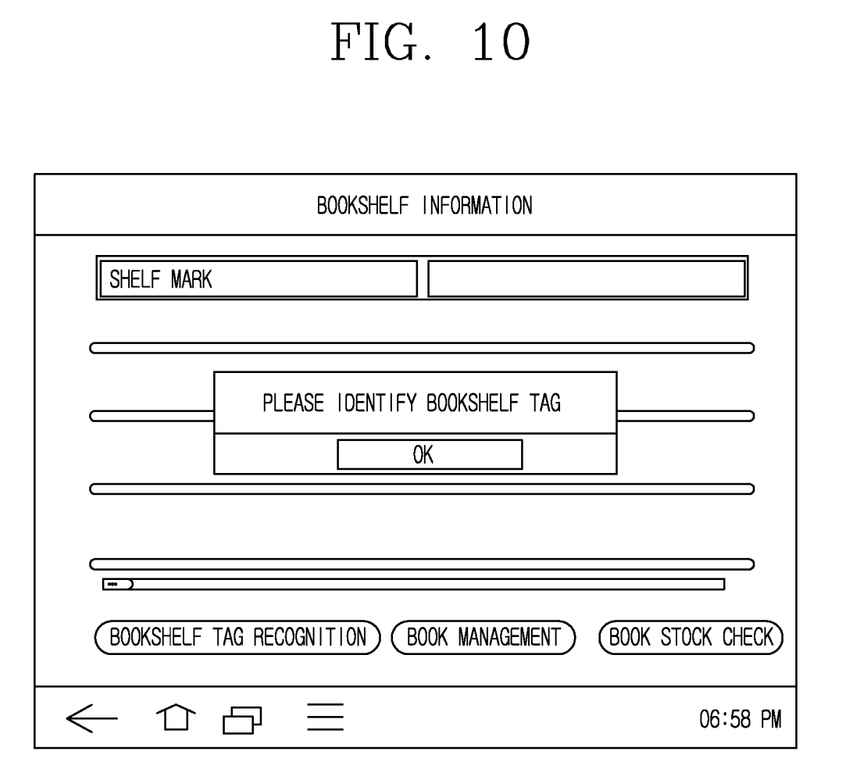

As illustrated in FIG. 10, the controller 780 may display a GUI for asking a user for recognition of an item identification tag after identification of an item group. As an example of checking a type of item identifier, the controller 780 may identify an identifier recognized from the moment as an item identifier.

Figure 11:
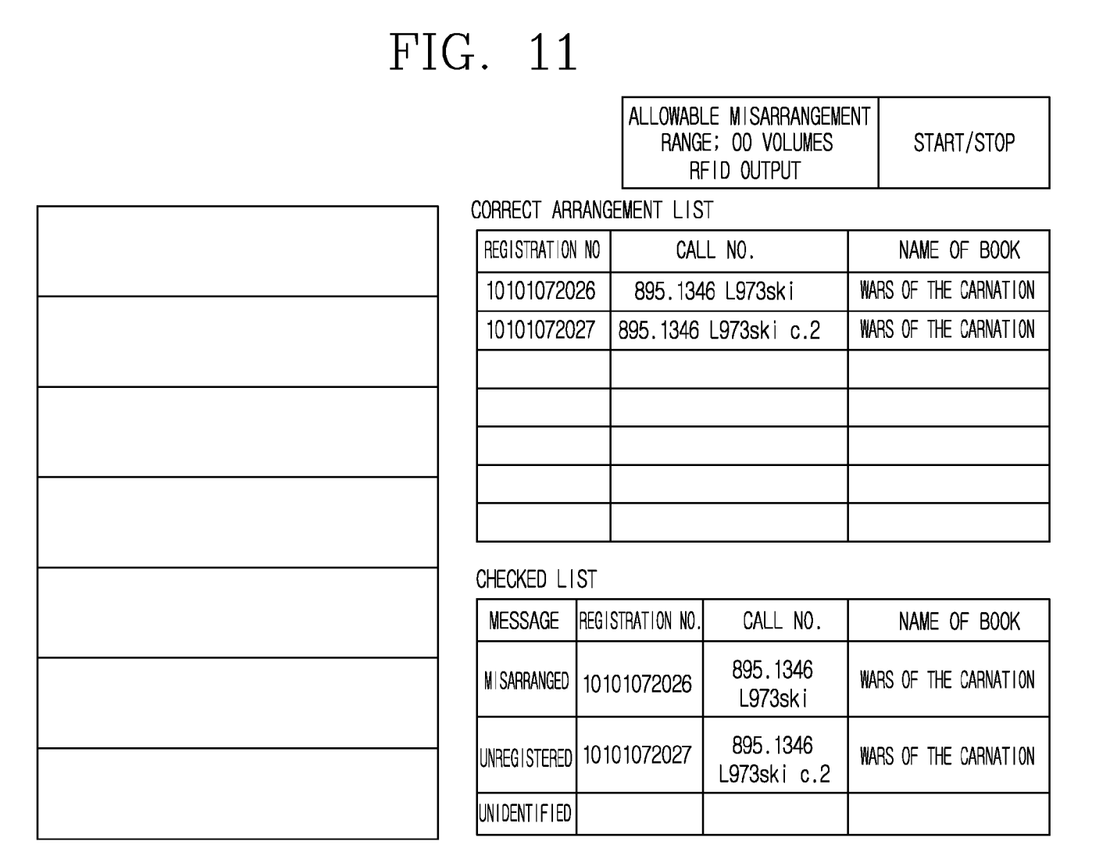
Figure 12:
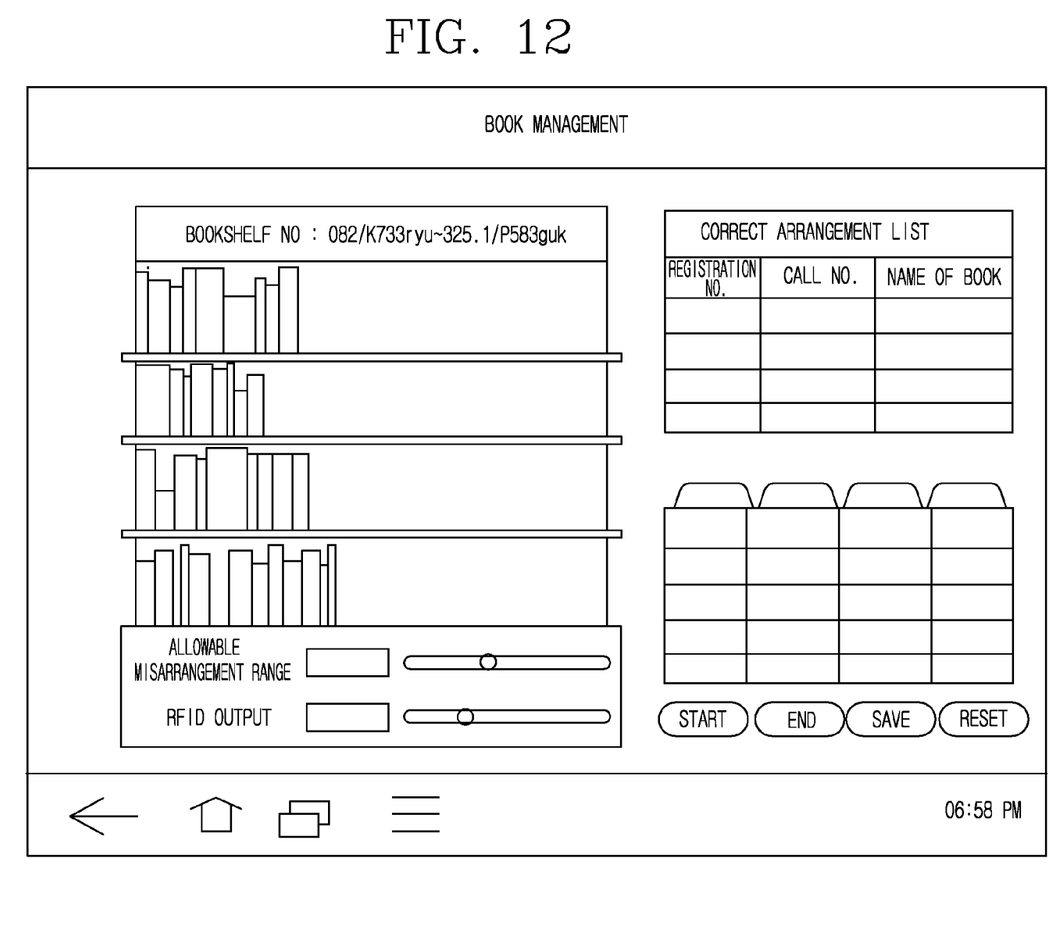

As illustrated in FIGS. 11 and 12, the controller 780 may display an item group arrangement region 10 on a left side of a screen, and display a list of correctly arranged items on a right upper side of the screen. Also, the controller 780 may display a list of incorrectly arranged items, a list of items unregistered, and a list of items missed (unidentified).

In accordance with an exemplary embodiment of the present disclosure, an item management function may be provided by a mobile terminal for a general purpose of use, with a wide display. Accordingly, when a name of an item as a target to be searched is received, the controller 780 may output a location of the item and a location of the mobile terminal 700 such that a user can recognize relative locations.

In accordance with another exemplary embodiment of the present disclosure, upon receiving a user input for a selection of an item as a target to be searched, the controller 780 may estimate a distance between the target and the mobile terminal 700 based on power intensity of the item identification tag 300 of the target, and output the item through the speaker 750 by changing sound according to the estimated distance.

Further, in accordance with one exemplary embodiment, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:

1. An operation method for a mobile terminal the method comprising:
   acquiring an item group identifier from a near field communication tag reader by recognizing an item group identification tag and an item identification tag;
   acquiring item group information related to an item group corresponding to the item group identifier;
   acquiring an item identifier from the near field communication tag reader;
   extracting information from the item group information, the extracted information related to an arrangement location of an item corresponding to the item identifier;
   determining that the item has been incorrectly arranged based on the arrangement location and an identified location of the item corresponding to the item identifier; and displaying information indicating that the item has been incorrectly arranged.

2. The method of claim 1, further comprising:

receiving identifies from the near field communication tag reader; and classifying the received identifiers into the item group identifier and the item identifier by checking a type of the received identifier.

3. The method of claim 2, wherein acquiring the item group information comprises:

requesting item group information related to the item group corresponding to the item group identifier from an item management server; and receiving the requested item group information from the item management server.

4. The method of claim 1, wherein determining that the item has been correctly arranged comprises:

comparing a difference between the arrangement location and the identified location of the item with a threshold value.

5. The method of claim 1, further comprising:

extracting information related to a shape of the item corresponding to the item identifier from the item group information; and displaying the item into the shape according to an identification sequence of the item.

6. The method of claim 5, wherein displaying the item comprises:

displaying the item into a size when the information related to the shape of the item includes information related to the size.

7. The method of claim 6, wherein displaying the item further comprises:

displaying the item into a default shape when the information related to the shape of the item does not include shape-related information.

8. The method of claim 1, wherein displaying the information comprises:

providing a visual effect to the displayed item.

9. The method of claim 1, further comprising:

acquiring a list of incorrectly arranged items by checking whether each of the items has been correctly arranged; and displaying the list of incorrectly arranged items.

10. The method of claim 1, further comprising:

acquiring a list of correctly arranged items by checking whether each of the items has been correctly arranged; and displaying the list of correctly arranged items.

11. The method of claim 1, further comprising:

acquiring a list of items that are expected to be arranged but have not been identified by checking whether each of the items has been correctly arranged; and displaying the list of unidentified items.

* * * * *